(12) United States Patent
Kushida et al.

(10) Patent No.: US 7,656,283 B2
(45) Date of Patent: Feb. 2, 2010

(54) VEHICLE RECOGNIZING APPARATUS

(75) Inventors: Kazumitsu Kushida, Wako (JP);
Mutsumi Katayama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 112 days.

(21) Appl. No.: 11/359,108

(22) Filed: Feb. 22, 2006

(65) Prior Publication Data

US 2006/0185918 A1 Aug. 24, 2006

(30) Foreign Application Priority Data

Feb. 23, 2005 (JP) .............................. 2005-047014

(51) Int. Cl.
*B60Q 1/26* (2006.01)

(52) U.S. Cl. .................... 340/468; 340/425.5

(58) Field of Classification Search .................. 340/468
See application file for complete search history.

(56) References Cited

U.S. PATENT DOCUMENTS

| | | | | |
|---|---|---|---|---|
| 3,916,377 A * | 10/1975 | Demeter | ..................... | 340/427 |
| 4,011,443 A * | 3/1977 | Smith et al. | .................. | 362/231 |
| 4,779,169 A * | 10/1988 | Cruze | .......................... | 362/474 |
| 6,908,103 B2 * | 6/2005 | Umeda et al. | ............. | 280/730.1 |
| 2003/0179087 A1 * | 9/2003 | Stahel | ......................... | 340/475 |
| 2005/0117236 A1 * | 6/2005 | Tanaka et al. | ................ | 359/876 |
| 2006/0198154 A1 * | 9/2006 | Naylor | ........................ | 362/473 |

FOREIGN PATENT DOCUMENTS

| | | |
|---|---|---|
| CN | 2277357 Y | 4/1998 |
| CN | 1336307 A | 2/2002 |
| CN | 1456471 A | 11/2003 |
| DE | 1 806 893 U | 2/1960 |
| DE | 1 111 969 A | 7/1961 |
| DE | 39 02 627 A1 | 8/1990 |
| DE | 196 23 068 A1 | 12/1997 |
| EP | 1 362 775 B1 | 3/2008 |
| GB | 834060 A | 5/1960 |
| JP | 60148731 A * | 8/1985 |
| JP | 10-115519 | 5/1998 |
| JP | 10115519 A * | 5/1998 |
| JP | 2002-46676 A | 2/2002 |

OTHER PUBLICATIONS

Office Action issued Apr. 28. 2009 by the German Patent Office in related application DE 10 2006 008 279.6-31.
Office Action issued by the State Intellectual Property Office of China on Jul. 24, 2009 in related application No. CN 200610008694.9.

* cited by examiner

*Primary Examiner*—Toan N Pham
*Assistant Examiner*—Kerri McNally
(74) *Attorney, Agent, or Firm*—Hamre, Schumann, Mueller & Larson, P.C.

(57) ABSTRACT

A vehicle recognizing apparatus which does not require a sophisticated image processing function of a vehicle on a recognizing side and allows a recognized vehicle to be immediately and accurately recognized by a simple image processing system. A pair of first and second infrared markers on the left and right sides are, respectively, placed at a pair of left and right vehicle components. Furthermore, a third infrared marker is provided to form a virtual triangle which may be easily distinguished by a recognizing system from extraneous infrared light sources.

13 Claims, 6 Drawing Sheets

VEHICLE RECOGNIZING APPARATUS

FIELD

The present invention generally pertains to the field of vehicle recognizing apparatuses, and more particularly to a vehicle recognizing apparatus which does not require a sophisticated image processing function of a vehicle on a recognizing side, and rather allows a recognized vehicle to be immediately and accurately recognized by a simple image processing system. This apparatus is suitable for causing the presence of a two-wheeled vehicle to be recognized by another vehicle.

BACKGROUND

In order to cause the presence of a two-wheeled vehicle to be recognized by other drivers, in some areas, the driver of a two-wheeled vehicle is required to drive with the vehicle's lights on during both the day and night. To further address this visibility issue, developments have been made for vehicle recognition systems in which the presence of a vehicle equipped with such an apparatus is recognized by another vehicle and the recognizing vehicle performs a predetermined control process, or alternately, a vehicle equipped with such an apparatus first recognizes the presence of the other vehicle and then executes a predetermined control process.

Japanese Patent Laid-open Publication No. 10-115519 proposes a vehicle position recognition system wherein a preceding vehicle is provided with three or more infrared LEDs facing rearwardly, and a following vehicle is provided with a camera whose field of view encompasses the rear face of the vehicle body of the preceding vehicle. Based on an infrared image of the preceding vehicle taken by the camera of the following vehicle, the distance between the vehicles and relative motion are determined.

However, in vehicle recognition systems which utilize infrared light, it is necessary to accurately and immediately recognize whether infrared light detected by an imaging device of the recognizing vehicle is a proper signal-light emitted from a light emitting element for vehicle recognition, or just infrared light from an extraneous source. This requires a sophisticated image processing function within the recognizing system.

In addition, in Japanese Patent Laid-open Publication No. 10-115519, the infrared LEDs to be recognized need to be disposed at a plurality of places on the preceding vehicle. However, when the preceding or oncoming vehicle is a two-wheeled vehicle, it is difficult to locate the infrared LEDs so that an accurate vehicle distance and relative motion can be determined. Furthermore, it is difficult to arrange a number of infrared LEDs without detracting significantly from the aesthetic beauty of the vehicle.

The present disclosure discloses a vehicle recognizing apparatus which solves many of the problems associated with existing vehicle recognizing apparatuses.

BRIEF SUMMARY

The invention(s) generally relates to a vehicle recognizing apparatus suitable for causing the presence of a two-wheeled vehicle to be recognized by another vehicle.

An object of the present invention is to solve the aforementioned problems of the conventional technologies and to provide a vehicle recognizing apparatus which does not require a sophisticated image processing function in a vehicle on the recognizing side, which can be easily applied to a two-wheeled vehicle as a recognized vehicle, and which does not mar the beauty and design of the recognized vehicle.

To achieve the aforementioned object, in a vehicle recognizing apparatus causing the presence of a vehicle equipped with the apparatus to be recognized by others therearound, the present invention includes at least three infrared markers emitting infrared light; and a drive circuit causing each of the infrared markers to emit light. The three markers are distributed and placed at respective vertices of a virtual triangle in at least one of front and rear views of the vehicle, and the first and second infrared markers are distributed and placed at a pair of right and left vehicle components. This triangular arrangement allows vehicles having such a device to be readily discerned from other infrared sources. Exemplary embodiments include first and second infrared markers distributed and placed at right and left side-view mirrors, at right and left turn-signal lights, at right and left handle grip ends, at right and left turn-signal light stays, near right and left edges of a front cowl, or near right and left edges of a handle cover. Mounting the infrared sources in these locations allows for distributed infrared sources without the expense of providing an additional framework for their mounting. In addition, a headlight may be disposed within a triangle with vertices at the three infrared markers, which allows the infrared markers to be easily and quickly recognized by preferentially searching an area around the headlight, which has high brightness and can be easily recognized.

DETAILED DESCRIPTION

Figure 1A:
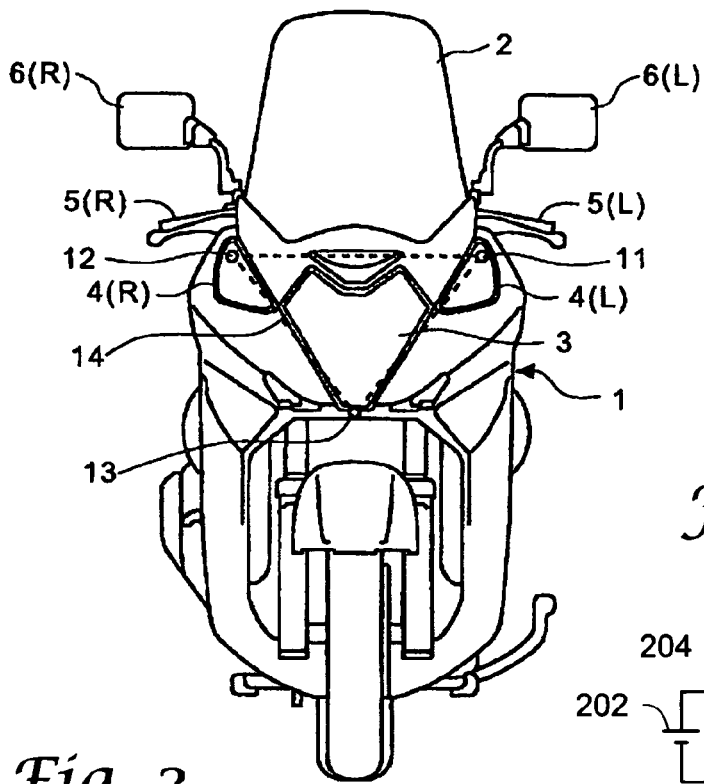
FIG. 1A is a front view of a motorized two-wheeled vehicle with a vehicle recognizing apparatus according to a first embodiment of the present invention.

Referring now to the drawings, wherein like reference numerals generally designate identical or corresponding parts throughout the several views, and more particularly to FIG. 1A, there is shown a front view of a motorized two-wheeled vehicle with a vehicle recognizing apparatus according to a first embodiment of the present invention. Same reference numerals in the various Figures indicate similar portions.

A front cowl 1 is attached to front part of a vehicle body, and a windshield 2 is attached to a V- or U-shaped open notch portion of an upper part of the front cowl 1. A headlight 3 is equipped at a center top part of the front cowl 1, and a pair of left and right turn-signal lights 4 (L, R) are equipped at both ends of the front cowl 1 with the headlight 3 interposed therebetween. Each of the headlight 3 and turn-signal lights 4 is a vehicle light satisfying safety standards. A pair of left and right side-view mirrors 6 (L, R) are equipped at bases of left and right handle grips 5 (L, R), respectively.

Furthermore, in this embodiment, first and second infrared markers 11 and 12 are, respectively, placed in reflector surfaces within the pair of left and right turn-signal lights 4 (L, R). Each of the infrared markers 11 and 12 is a light emitting marker including a near-infrared LED as a light source. Each of the first and second infrared markers 11 and 12 may be composed of a single LED or may be composed of a plurality of LEDs integrated or aggregated. Current to each of the infrared markers 11 and 12 is provided by a drive circuit 200 as shown in FIG. 1B.

Figure 1B:
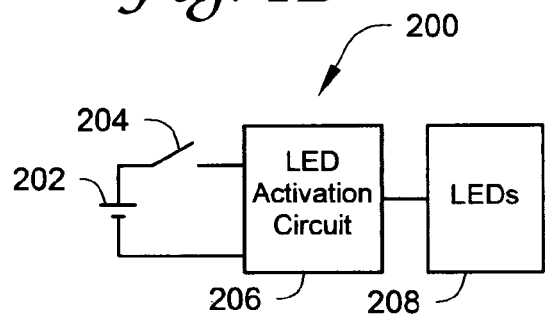
FIG. 1B is an embodiment of a drive circuit which supplies current to each of the infrared markers.

FIG. 1B shows an embodiment of a drive circuit 200 which comprises a current source 202, an ignition switch 204, an LED activation circuit 206, and a multiplicity of LEDs 208. Such LED drive circuits are common in the art, so in order to preserve brevity and enhance the clarity of the detailed description herein, details of the circuit will not be further discussed herein.

Additionally, in this embodiment, a third infrared marker 13 is provided below the headlight 3 of the front cowl 1 so as to be directed ahead of the vehicle body. Accordingly, in an infrared image of the front view of the vehicle, an inverted triangle 14 with vertices at the first to third infrared markers 11 to 13 is recognized. The headlight 3 is disposed within the triangle 14.

According to this embodiment, the three infrared markers 11 to 13 are distributed and placed at vertices of the virtual triangle in the front view of the vehicle body. Accordingly, it can be easily recognized whether infrared light detected in the infrared image obtained by shooting the vehicle is light from the infrared markers or light from an extraneous source.

Moreover, in this embodiment, the headlight 3 is disposed within the triangle 14 with the vertices at the three infrared markers 11 to 13. Accordingly, the infrared markers can be easily and quickly recognized by preferentially searching an area around the headlight 3, which has high brightness and can be easily recognized by a vehicle recognition system.

Furthermore, in this embodiment, the first and second infrared markers 11 and 12 are disposed inside the turn-signal lights 4 (L, R) as a pair of left and right vehicle components, respectively. Accordingly, the two infrared markers 11 and 12 can be easily distributed and placed in the left and right sides of the vehicle body without having to mount them separately on an external structure. Specifically, the light source of each turn-signal light 4 and the infrared light source (LED) of each infrared marker are described as being accommodated in a same light body in the above embodiment but may be accommodated in separate light bodies and disposed adjacent to each other. When these light sources are accommodated in a same light body, the light of the turn-signal light 4 may be divided into a light source part for the turn-signal light 4 and a light source (LED) part for the infrared marker, or may be integrated. When the turn-signal light 4 is divided, the light of the infrared marker portion can be opaque to visible light to make the light source externally invisible. In addition, in the case where the light sources of the turn-light source 4 and infrared marker are accommodated in the same light body, a partition wall may be provided between the light sources. This can prevent the near-infrared component outputted from the light source of the infrared marker from being masked by the infrared light component contained in the light source of the turn-signal light 4.

According to the aforementioned structure, the first and second infrared markers 11 and 12 are preferably integrated within the structure of the existing lights, and thus the beauty and design of the vehicle are not diminished by the presence of the first and second infrared markers 21 and 22.

Figure 2:
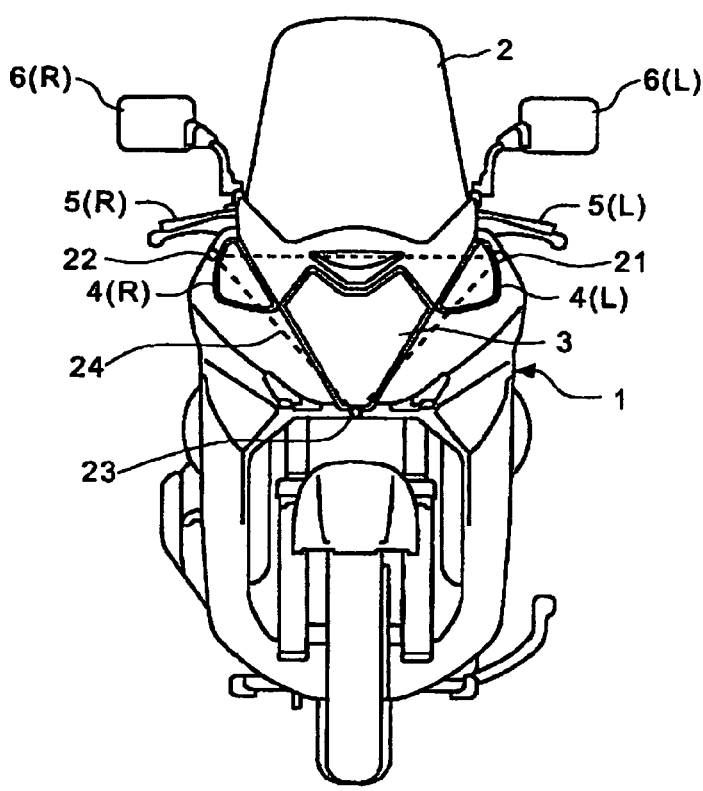
FIG. 2 is a front view of a motorized two-wheeled vehicle with a vehicle recognizing apparatus according to a second embodiment of the present invention.

FIG. 2 is a front view of a motorized two-wheeled vehicle with a vehicle recognizing apparatus according to a second embodiment of the present invention. In this embodiment a pair of first and second infrared markers 21 and 22 on the left and right sides are, respectively, placed near the left and right edges of the front cowl 1 above the headlight 3 so as to be directed ahead of the vehicle body. A third infrared marker 23 is placed below the headlight 3 of the front cowl 1 similar to the above first embodiment.

Also in this embodiment, an inverted triangle 24 with vertices at the first to third infrared markers 21 to 23 is recognized in an infrared image of the front view of the vehicle. The headlight 3 is disposed within the triangle 24. The two infrared markers 21 and 22 can be easily distributed and placed at the left and right sides of the vehicle body without separately preparing space to place the same, attachment members, and the like.

Figure 3:
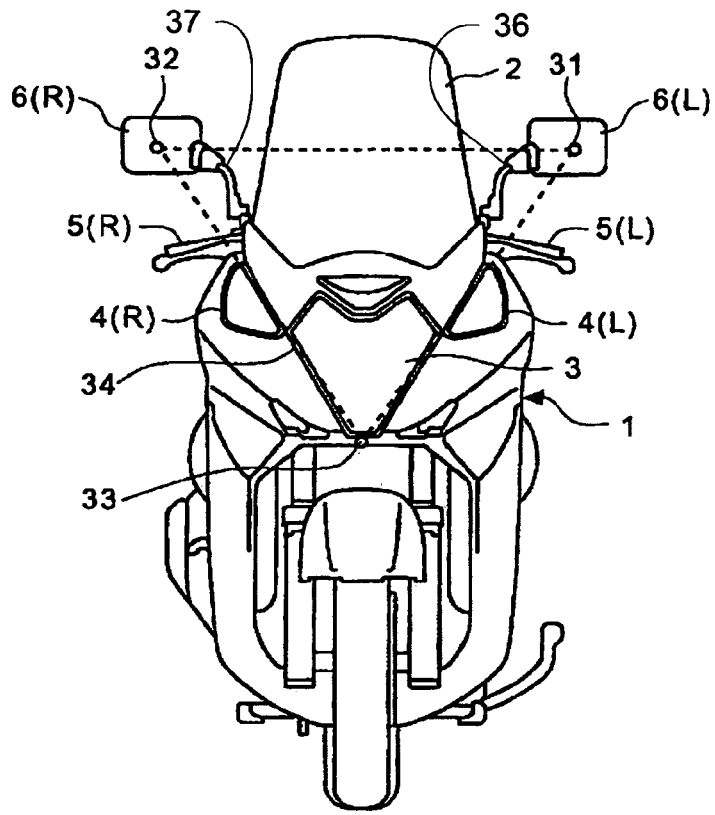
FIG. 3 is a front view of a motorized two-wheeled vehicle with a vehicle recognizing apparatus according to a third embodiment of the present invention.

FIG. 3 is a front view of a motorized two-wheeled vehicle with a vehicle recognizing apparatus according to a third embodiment of the present invention. In this embodiment, a pair of first and second infrared markers 31 and 32 are, respectively, placed in rear surfaces (the rear sides of the mirror surfaces) of the left and right side-view mirrors 6 (L, R) so as to be directed ahead of the vehicle body. Similar to the aforementioned first and second embodiments, a third infrared marker 33 is provided below the headlight 3 of the front cowl 1 so as to be directed ahead of the vehicle body.

Also in this embodiment, an inverted triangle 34 with vertices at the first to third infrared markers 31 to 33 is recognized in an infrared image of the front view of the vehicle. The headlight 3 is disposed within the triangle 34. Alternately, in this embodiment the first and second infrared markers 31 and 32 may be placed at edges of the side-view mirrors 6 so as to be recognized not only when seen from the front of the vehicle but also when seen from the back thereof. This eliminates the need to separately provide the infrared markers in the front and rear of the vehicle. In this embodiment a drive circuit of each infrared marker may be accommodated in space formed behind the mirror so that the aerodynamic properties of the side-view mirrors 6 are not greatly impacted with the addition of the infrared markers 31 and 32.

According to this embodiment, the first and second infrared markers 31 and 32 are disposed in the side-view mirrors 6, which are widely spaced from each other in the lateral direction of the vehicle. Accordingly, the first and second infrared markers 31 and 32 can be easily disposed on the left and right sides of the vehicle body so as to be widely spaced from each other in the lateral direction without separately preparing space to place the same, attachment members, and the like. Moreover, the side mirrors 6 are not integrally designed with the vehicle body in many cases, and the infrared markers being provided for the side-view mirrors 6 cannot mar the beauty and design.

The infrared markers 31 and 32 are described as being provided for the side-view mirrors 6 in this embodiment but may be provided on the left and right stay portions, 36 and 37, respectively, to support the side-view mirrors 6 on the vehicle body.

Figure 4:
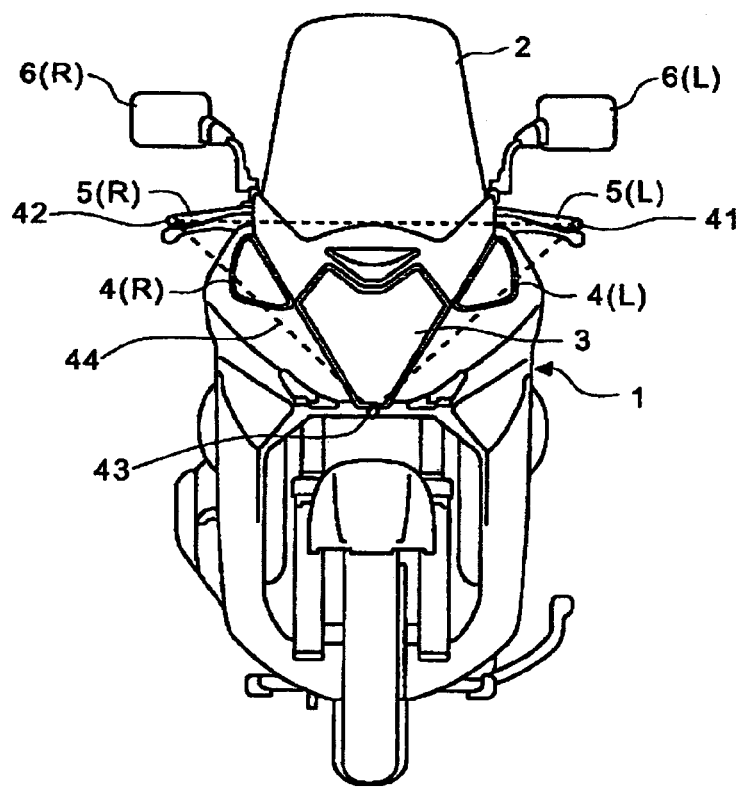
FIG. 4 is a front view of a motorized two-wheeled vehicle with a vehicle recognizing apparatus according to a fourth embodiment of the present invention.

FIG. 4 is a front view of a motorized two-wheeled vehicle with a vehicle recognizing apparatus according to a fourth embodiment of the present invention. In this embodiment, a pair of first and second infrared markers 41 and 42 are, respectively, provided at ends of the left and right handle grips 5 so as to be directed ahead of the vehicle body. A third infrared marker 43 is provided below the headlight 3 of the front cowl 1 similar to the aforementioned first to third embodiments.

Also in this embodiment, an inverted triangle 44 with vertices at the first to third infrared markers 41 to 43 is recognized in an infrared image of the front view of the vehicle. The headlight 3 is disposed within the triangle 44. The two infrared markers 41 and 42 can be easily distributed and placed at the left and right sides of the vehicle body without separately preparing space to place the same, attachment members, and the like. Furthermore, since the first and second infrared markers 41 and 42 are provided for the handle grips 5, each infrared marker can be easily recognized by a recognizing apparatus which may be located in the steering direction of the recognized vehicle, especially when it is operating at low speed, and even when the steering angle of the recognized vehicle is large.

Figure 5:
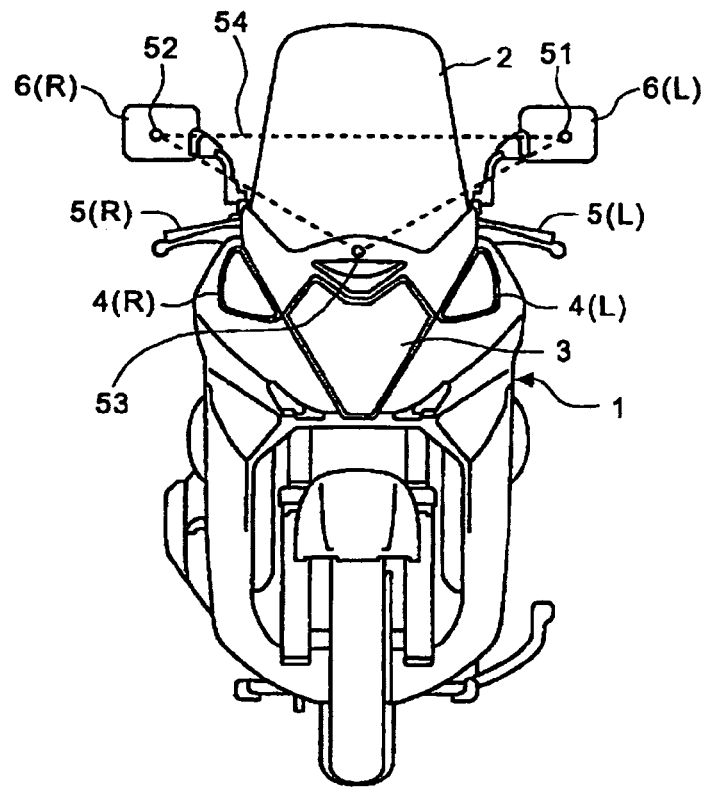
FIG. 5 is a front view of a motorized two-wheeled vehicle with a vehicle recognizing apparatus according to a fifth embodiment of the present invention.

FIG. 5 is a front view of a motorized two-wheeled vehicle with a vehicle recognizing apparatus according to a fifth embodiment of the present invention. In this embodiment, a pair of first and second infrared markers 51 and 52 are, respectively, provided in the rear surfaces of the left and right side-view mirrors 6 (L, R) so as to be directed ahead of the vehicle body. Furthermore, a third infrared marker 53 is provided above the headlight 3 of the front cowl 1 so as to be directed ahead of the vehicle body.

In this embodiment, an inverted triangle 54 with vertices at the first to third infrared markers 51 to 53 is recognized above the headlight 3 in an infrared image of the front view of the vehicle.

Figure 6:
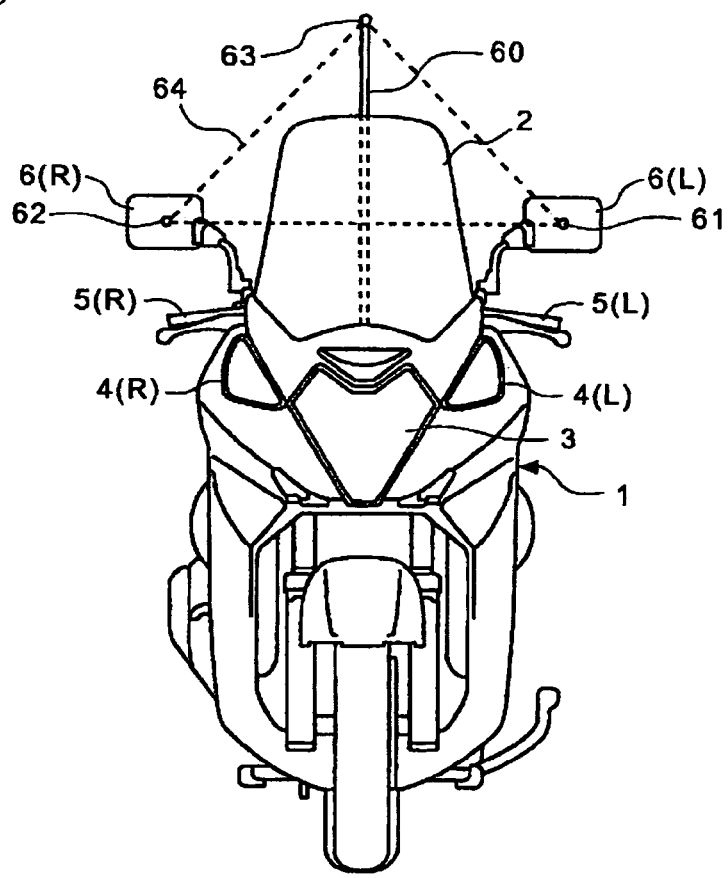
FIG. 6 is a front view of a motorized two-wheeled vehicle with a vehicle recognizing apparatus according to a sixth embodiment of the present invention.

FIG. 6 is a front view of a motorized two-wheeled vehicle with a vehicle recognizing apparatus according to a sixth embodiment of the present invention. In this embodiment, a pair of first and second infrared markers 61 and 62 are, respectively, provided in the rear surfaces of the left and right side-view mirrors 6 (L, R) so as to be directed ahead of the vehicle body similar to the aforementioned third and fifth embodiments. In this embodiment, an upright support member 60 is located on a longitudinal centerline of the vehicle, and a third infrared marker 63 is placed in an upper part of the support member 60 so as to be directed ahead of the vehicle body.

In this embodiment, an inverted triangle 64 with vertices at the first to third infrared markers 61 to 63 is recognized above the headlight 3 in an infrared image of the front view of the vehicle. According to this embodiment, one of the infrared markers can be disposed at a high place, thus improving the ability of the infrared marker to be recognized.

In the description of the aforementioned embodiments, the infrared markers are distributed and placed at three places, and a triangle with vertices at the infrared markers is virtually formed when the vehicle is seen from the front. The present invention is not limited only to this, and the infrared markers may be distributed and placed at four places or more.

Figure 7:
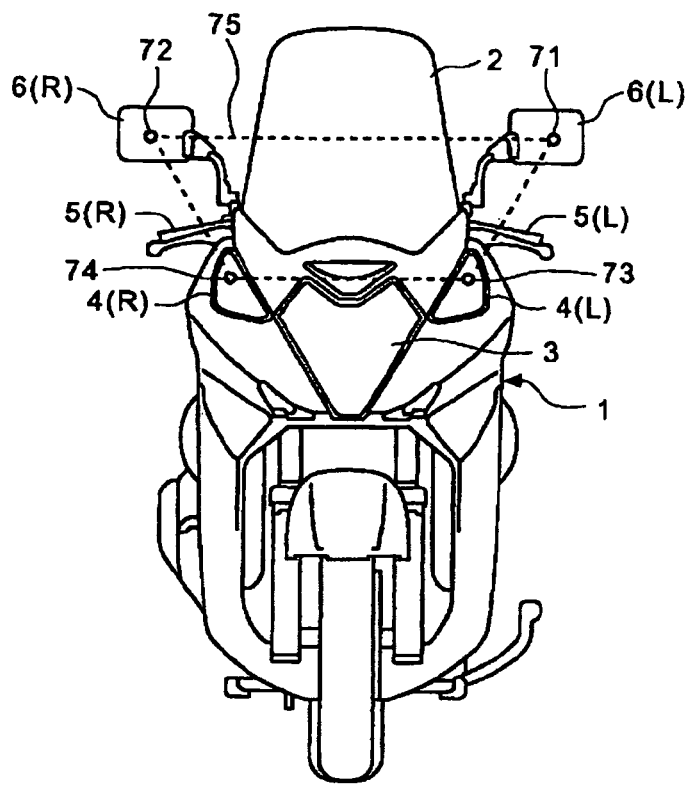
FIG. 7 is a front view of a motorized two-wheeled vehicle with a vehicle recognizing apparatus according to a seventh embodiment of the present invention.

FIG. 7 is a front view of a motorized two-wheeled vehicle with a vehicle recognizing apparatus according to a seventh embodiment of the present invention. In this embodiment, a pair of first and second infrared markers 71 and 72 are, respectively, provided in the rear surfaces of the left and right side-view mirrors 6 (L, R) so as to be directed ahead of the vehicle body. Furthermore, third and fourth infrared markers 73 and 74 are, respectively, placed in reflector surfaces of the paired left and right turn-signal lights 4 (L, R).

In this embodiment, a trapezoid 75 with vertices at the first to fourth infrared markers 71 to 74 is recognized above the headlight 3 in an infrared image of the front view of the vehicle.

Figure 8:
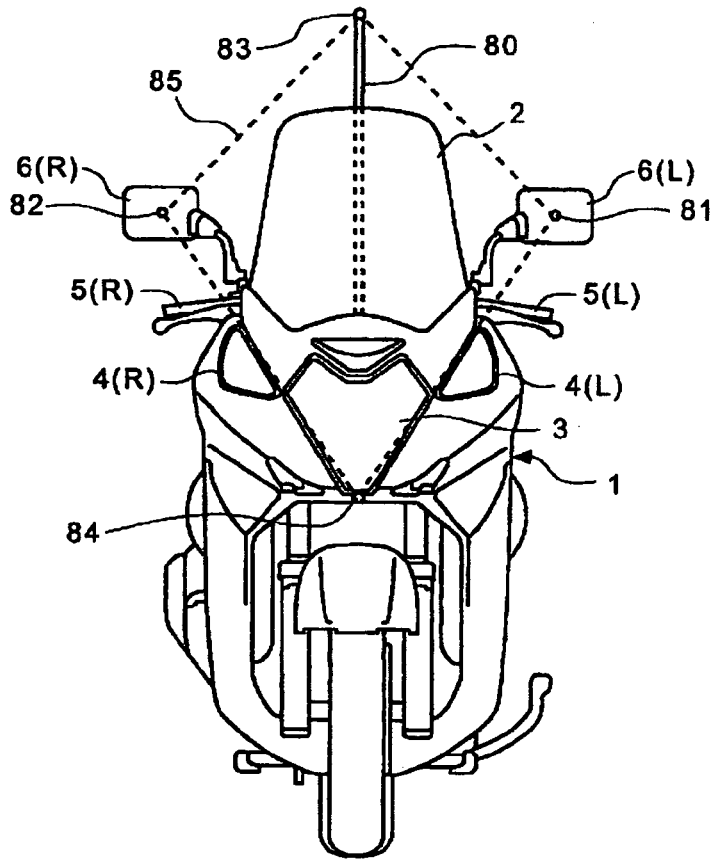
FIG. 8 is a front view of a motorized two-wheeled vehicle with a vehicle recognizing apparatus according to an eighth embodiment of the present invention.

FIG. 8 is a front view of a motorized two-wheeled vehicle with a vehicle recognizing apparatus according to an eighth embodiment of the present invention. In this embodiment, a pair of first and second infrared markers 81 and 82 are, respectively, placed in the rear surfaces of the left and right side-view mirrors 6 (L, R) so as to be directed ahead of the vehicle body. Moreover, similar to the aforementioned sixth embodiment, an upright support member 80 is located on a longitudinal centerline of the vehicle, and a third infrared marker 83 is placed in an upper part of the support member 80 so as to be directed ahead of the vehicle body. In addition, a fourth infrared marker 84 is provided below the headlight 3 of the front cowl 1 so as to be directed ahead of the vehicle body similar to the aforementioned first to third embodiments.

In this embodiment, a vertically long quadrilateral 85 with vertices at the first to fourth infrared markers 81 to 84 is recognized. The headlight 3 is disposed within the vertically long quadrilateral 85 in an infrared image of the front view of the vehicle.

Figure 9:
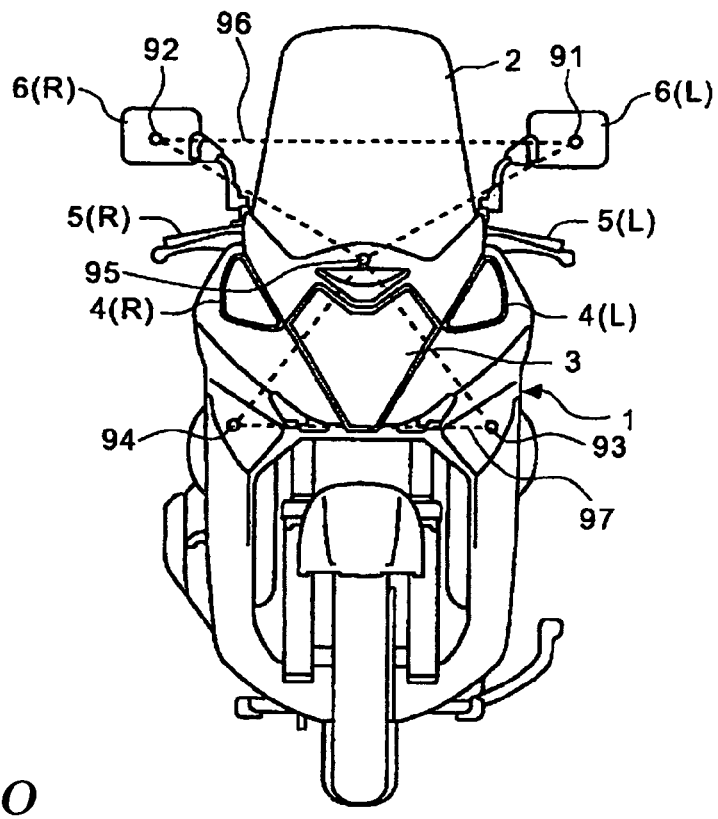
FIG. 9 is a front view of a motorized two-wheeled vehicle with a vehicle recognizing apparatus according to a ninth embodiment of the present invention.

FIG. 9 is a front view of a motorized two-wheeled vehicle with a vehicle recognizing apparatus according to a ninth embodiment of the present invention. In this embodiment, a pair of first and second infrared markers 91 and 92 are, respectively, provided in the rear surfaces of the left and right side-view mirrors 6 (L, R) so as to be directed ahead of the vehicle body. Furthermore, a pair of third and fourth infrared markers 93 and 94 in the left and right sides are, respectively, placed near the left and right edges of the front cowl 1 below the headlight 3 so as to be directed ahead of the vehicle body. Furthermore, a fifth infrared marker 95 is provided above the headlight 3 of the front cowl 1 so as to be directed ahead of the vehicle body.

In this embodiment, two triangles 91-92-95 and 93-94-95, which share the infrared marker 95 and are located opposite to one another, are recognized in an infrared image of the front view of the vehicle.

According to this embodiment, the figure with vertices at five infrared markers has a specific shape, and it can be easily recognized whether infrared light sources appearing in the infrared image are the infrared markers or are infrared light from an extraneous source.

Each of the previous embodiments uses the two-wheeled vehicle having a front cowl 1 as an example. However, the present invention is not limited only to this type of vehicle, and can be also applied to a two-wheeled vehicle without a front cowl.

Figure 10:
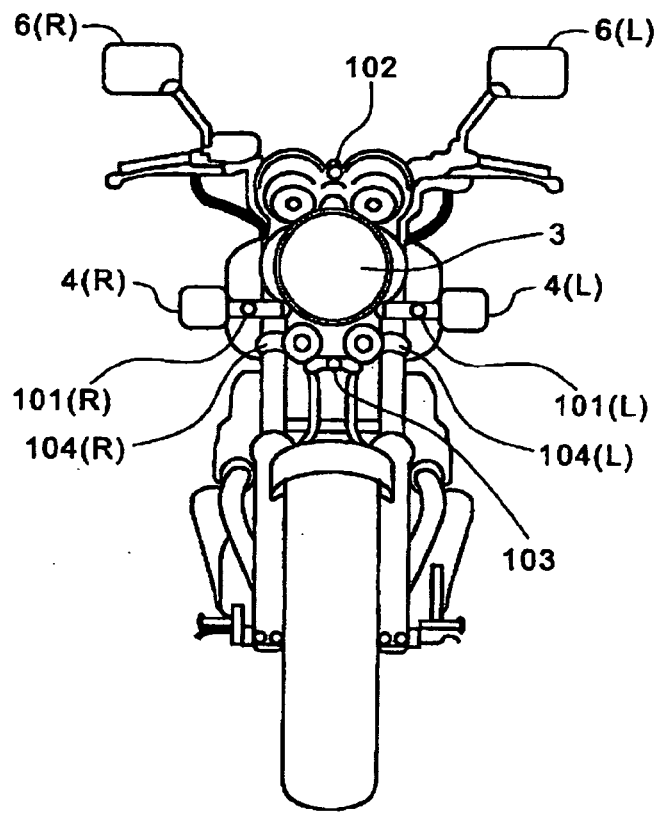
FIG. 10 is a front view of a motorized two-wheeled vehicle with a vehicle recognizing apparatus according to a tenth embodiment of the present invention.

FIG. 10 is a front view of a motorized two-wheeled vehicle, without a front cowl, having a vehicle recognizing apparatus according to a tenth embodiment of the present invention. In a motorized two-wheeled vehicle without a front cowl, the infrared markers may be distributed and placed at a pair of left and right turn-signal light stays 101 (L, R) supporting the left and right turn-signal lights 4 (L, R), a meter unit 102, a handle stay 103, a pair of left and right handle pipes 104 (L, R), and the like.

Figure 11:
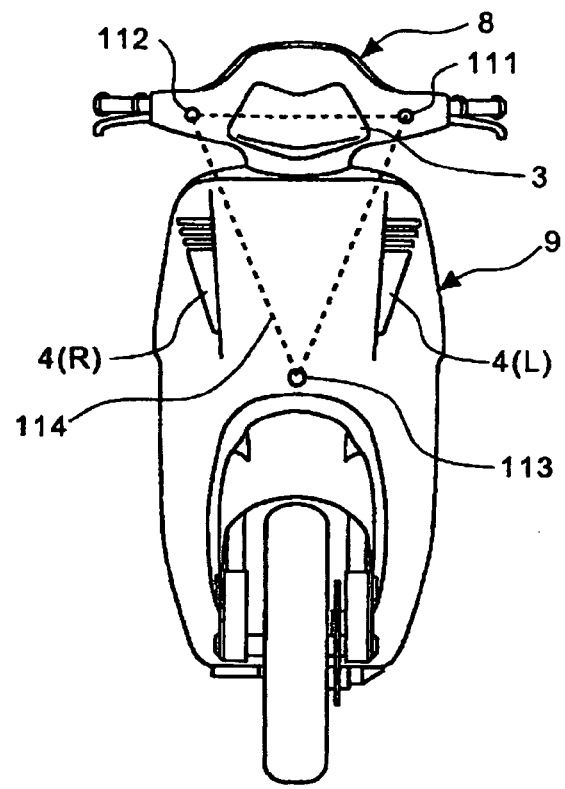
FIG. 11 is a front view of a scooter-type motorized two-wheeled vehicle with a vehicle recognizing apparatus according to an eleventh embodiment of the present invention.

FIG. 11 is a front view of a scooter-type motorized two-wheeled vehicle with a vehicle recognizing apparatus according to an eleventh embodiment of the present invention. In this embodiment, a pair of first and second infrared markers 111 and 112 are, respectively, provided at left and right sides of a handle cover 8, which is provided so as to cover the center part of the handle. A third infrared marker 113 is placed in the center part of a front cover 9. Also in this embodiment, an inverted triangle 114 with vertices at the first to third infrared markers 111 to 113 is recognized in an infrared image of the front view of the vehicle.

In each of the aforementioned embodiments, the infrared markers are described as being in the front of the vehicle. However, the infrared markers may also be provided so as to be recognized from the back of the vehicle.

Figure 12:
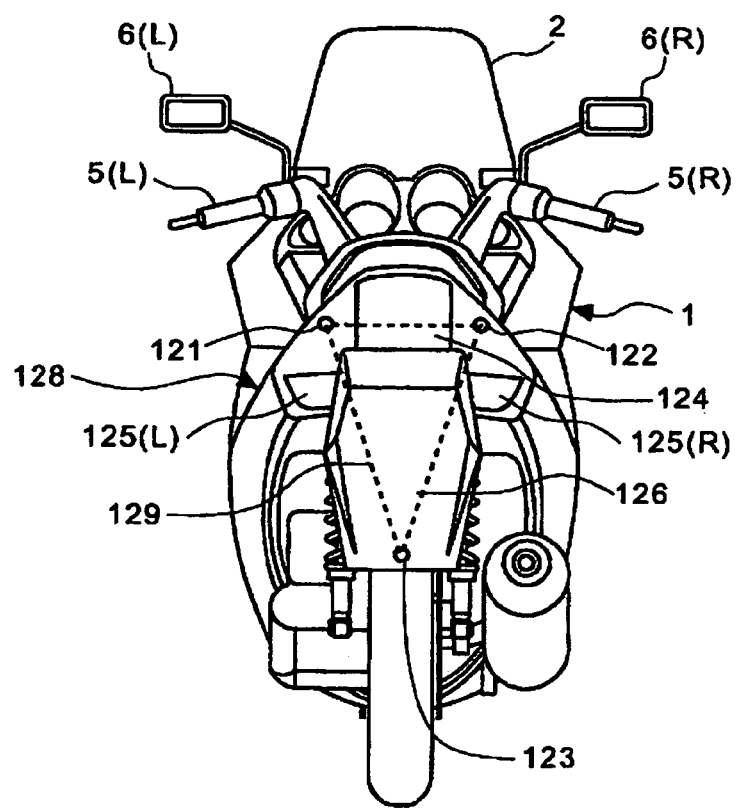
FIG. 12 is a rear view of a motorized two-wheeled vehicle with a vehicle recognizing apparatus according to a twelfth embodiment of the present invention.

FIG. 12 is a rear view of a twelfth embodiment with the infrared markers provided in rear part of the motorized two-wheeled vehicle. In this embodiment, a taillight 124 is positioned at the center of a rear cowl 128, and a pair of left and right turn-signal lights 125 (L, R) are positioned below the taillight 124. First and second infrared markers 121 and 122 are placed apart from each other at both sides of the taillight 124. A third infrared marker 123 is placed in the lower center of a license plate holder 126. Also in this embodiment, an inverted triangle 129 with vertices at the first to third infrared markers 121 to 123 is recognized in an infrared image of the rear view of the vehicle.

It should be understood that even though these numerous characteristics and advantages of various embodiments have been set forth in the foregoing description, together with details of the structure and function of the embodiments, the disclosure is illustrative only, and changes may be made in detail, especially in matters of shape, size and arrangement of parts within the principles of the invention(s) claimed in the appended claims to the full extent indicated by the broad general meaning of the terms in which the appended claims are expressed.

What is claimed is:

1. A motorcycle recognizing apparatus allowing a presence of a motorcycle to be recognized by other vehicles, comprising:
    at least three infrared markers; and
    a drive circuit causing each of the infrared markers to emit light, wherein
    a first infrared marker and a second infrared marker and a third infrared marker are placed at respective vertices of a virtual triangle and are viewable from both front and rear views of the motorcycle, and the first and second infrared markers are distributed and placed at right and left side mirrors, the first and second infrared markers being on opposite sides of one of a headlight and a tail light,
    wherein the infrared markers are easily recognized by searching around said one of the headlight and the tail light, and
    wherein the headlight is placed within the virtual triangle having vertices at the first infrared marker, the second infrared marker, and the third infrared marker.

2. The motorcycle recognizing apparatus according to claim 1, wherein said motorcycle includes an upright support member on a longitudinal centerline of the motorcycle, and the third infrared marker is placed in an upper part of the support member.

3. A motorcycle recognizing apparatus allowing a presence of a motorcycle to be recognized by other vehicles, comprising:
    at least three infrared markers; and
    a drive circuit causing each of the infrared markers to emit light, wherein
    a first infrared marker and a second infrared marker and a third infrared marker are placed at respective vertices of a virtual triangle and are viewable from both front and rear views of the motorcycle, and the first and second infrared markers are distributed and placed at right and left turn-signal lights, the first and second infrared markers being on opposite sides of one of a headlight and a tail light,
    wherein the infrared markers are easily recognized by searching around said one of the headlight and the tail light, and
    wherein the headlight is placed within the virtual triangle having vertices at the first infrared marker, the second infrared marker, and the third infrared marker.

4. The motorcycle recognizing apparatus according to claim 3, wherein said motorcycle includes an upright support member on a longitudinal centerline of the motorcycle, and the third infrared marker is placed in an upper part of the support member.

5. A motorcycle recognizing apparatus allowing a presence of a motorcycle to be recognized by other vehicles, comprising:
    at least three infrared markers; and
    a drive circuit causing each of the infrared markers to emit light, wherein
    a first infrared marker and a second infrared marker and a third infrared marker are placed at respective vertices of a virtual triangle and are viewable from both front and rear views of the motorcycle, and the first and second infrared markers are distributed and placed at ends of right and left handle grips, the first and second infrared markers being on opposite sides of one of a headlight and a tail light,
    wherein the infrared markers are easily recognized by searching around said one of the headlight and the tail light, and
    wherein the headlight is placed within the virtual triangle having vertices at the first infrared marker, the second infrared marker, and the third infrared marker.

6. The motorcycle recognizing apparatus according to claim 5, wherein said motorcycle includes an upright support member on a longitudinal centerline of the motorcycle, and the third infrared marker is placed in an upper part of the support member.

7. A motorcycle recognizing apparatus allowing a presence of a motorcycle to be recognized by other vehicles, comprising:
    at least three infrared markers; and
    a drive circuit causing each of the infrared markers to emit light, wherein
    a first infrared marker and a second infrared marker and a third infrared marker are placed at respective vertices of a virtual triangle and are viewable from both front and rear views of the motorcycle, and the first and second infrared markers are distributed and placed at right and left turn-signal stays, the first and second infrared markers being on opposite sides of one of a headlight and a tail light, wherein the infrared markers are easily recognized by searching around said one of the headlight and the tail light.

8. The motorcycle recognizing apparatus according to claim 7, wherein said motorcycle includes an upright support member on a longitudinal centerline of the motorcycle, and the third infrared marker is placed in an upper part of the support member.

9. The motorcycle recognizing apparatus according to claim 7, wherein the headlight is placed within the virtual triangle having vertices at the first infrared marker, the second infrared marker, and the third infrared marker.

10. A motorcycle recognizing apparatus allowing a presence of a motorcycle to be recognized by other vehicles, comprising:

at least three infrared markers; and a drive circuit causing each of the infrared markers to emit light, wherein a first infrared marker and a second infrared marker and a third infrared marker are placed at respective vertices of a virtual triangle and are viewable from both front and rear views of the motorcycle, wherein said motorcycle includes a front cowl, and said first and said second infrared markers are distributed and placed near right and left edges of the front cowl, the first and second infrared markers being on opposite sides of one of a headlight and a tail light, wherein the infrared markers are easily recognized by searching around said one of the headlight and the tail light, and wherein the headlight is placed within the virtual triangle having vertices at the first infrared marker, the second infrared marker, and the third infrared marker.

11. The motorcycle recognizing apparatus according to claim 10, wherein said motorcycle includes an upright support member on a longitudinal centerline of the motorcycle, and the third infrared marker is placed in an upper part of the support member.

12. A motorcycle recognizing apparatus allowing a presence of a motorcycle to be recognized by other vehicles, comprising:

at least three infrared markers; and a drive circuit causing each of the infrared markers to emit light, wherein a first infrared marker and a second infrared marker and a third infrared marker are placed at respective vertices of a virtual triangle and are viewable from both front and rear views of the motorcycle, wherein said motorcycle includes a handle cover, and said first and said second infrared markers are distributed and placed near right and left edges of the handle cover, the first and second infrared markers being on opposite sides of one of a headlight and a tail light, wherein the infrared markers are easily recognized by searching around said one of the headlight and the tail light, and wherein the headlight is placed within the virtual triangle having vertices at the first infrared marker, the second infrared marker, and the third infrared marker.

13. The motorcycle recognizing apparatus according to claim 12, wherein said motorcycle includes an upright support member on a longitudinal centerline of the motorcycle, and the third infrared marker is placed in an upper part of the support member.

* * * * *